United States Patent [19]

Fung et al.

[11] Patent Number: 5,040,153

[45] Date of Patent: * Aug. 13, 1991

[54] ADDRESSING MULTIPLE TYPES OF MEMORY DEVICES

[75] Inventors: Michael G. Fung, San Jose; Justin Wang, Saratoga, both of Calif.

[73] Assignee: Chips and Technologies, Incorporated, San Jose, Calif.

[*] Notice: The portion of the term of this patent subsequent to Feb. 6, 2007 has been disclaimed.

[21] Appl. No.: 473,509

[22] Filed: Feb. 1, 1990

Related U.S. Application Data

[63] Continuation of Ser. No. 112,967, Oct. 23, 1987, Pat. No. 4,899,272.

[51] Int. Cl.⁵ .......................... G11C 8/00; G11C 7/00; G06F 1/00; G06F 11/00
[52] U.S. Cl. .......................... 365/230.03; 365/189.08; 365/49; 365/231; 364/200
[58] Field of Search ............... 365/49, 189.01, 189.08, 365/185, 94, 230.03, 231

[56] References Cited

U.S. PATENT DOCUMENTS

| | | | |
|---|---|---|---|
| 4,016,545 | 4/1977 | Lipovski | 364/900 |
| 4,025,903 | 5/1977 | Kaufman et al. | 364/200 |
| 4,266,285 | 5/1981 | Panepinto, Jr. | 365/230.03 |
| 4,319,343 | 3/1982 | Powell | 365/196 |
| 4,330,825 | 5/1982 | Girard | 364/200 |
| 4,354,258 | 10/1982 | Sato | 365/189.07 |
| 4,400,794 | 8/1983 | Koos | 364/900 |
| 4,566,082 | 1/1986 | Anderson | 365/230.03 |
| 4,675,808 | 6/1987 | Grinn et al. | 364/200 |
| 4,752,915 | 6/1988 | Suzuki et al. | 365/230.03 |
| 4,758,996 | 7/1988 | Goldman | 365/230.02 |
| 4,780,855 | 10/1988 | Iida et al. | 365/94 |
| 4,787,060 | 11/1988 | Bondreau et al. | 364/200 |
| 4,809,234 | 2/1989 | Kuwashiro | 365/230.03 |
| 4,835,733 | 5/1989 | Powell | 364/900 |
| 4,860,252 | 8/1989 | Sykora | 364/900 |
| 4,899,272 | 2/1990 | Fung et al. | 365/49 |

OTHER PUBLICATIONS

Chips and Technologies Introduces First 386-CHIP-Set—Sets New Standard for Microcomputer Price/Performance (Press Rel.), Oct. 13, 1986.

Primary Examiner—Joseph A. Popek
Assistant Examiner—Jack A. Lane
Attorney, Agent, or Firm—Townsend and Townsend

[57] ABSTRACT

The present invention provides a memory addressing system that can accommodate multiple size DRAMS. DRAMS of various sizes can be mixed in a variety of ways. The present invention provides a hardware register associated with each pair of banks of DRAMS. This hardware register is programmable to indicate the type of DRAMS that have been inserted in the particular memory banks and to indicate the starting address of the particular set of memory banks. Using this technique, it is necessary to insert the largest memory chips in the first memory bank. Memory chips of either size can be inserted in either set of memory banks and the information in the programmable register is used to control circuitry which appropriately modifies the accessing signals which are sent to the memory system.

1 Claim, 3 Drawing Sheets

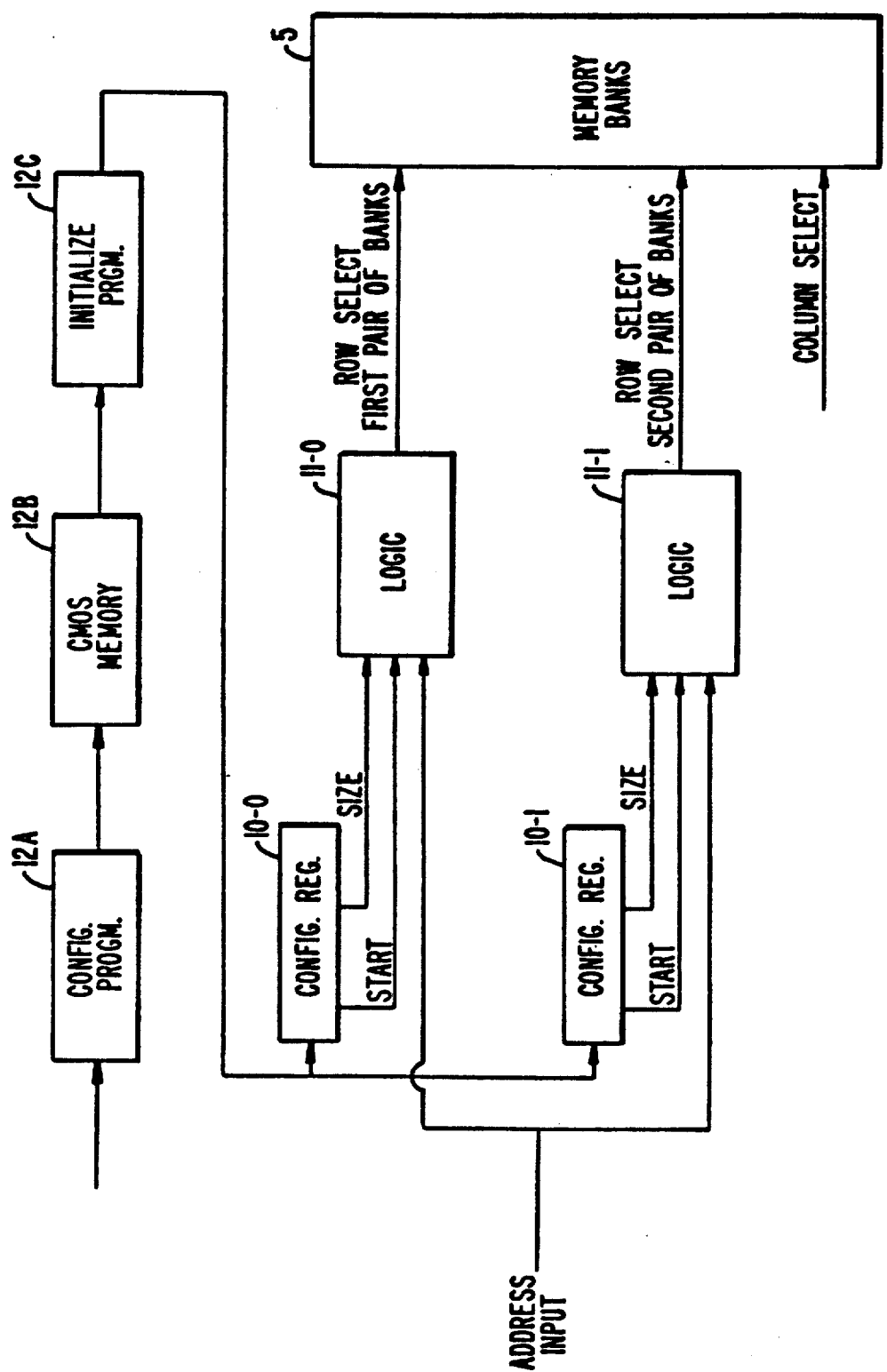
FIG._1.

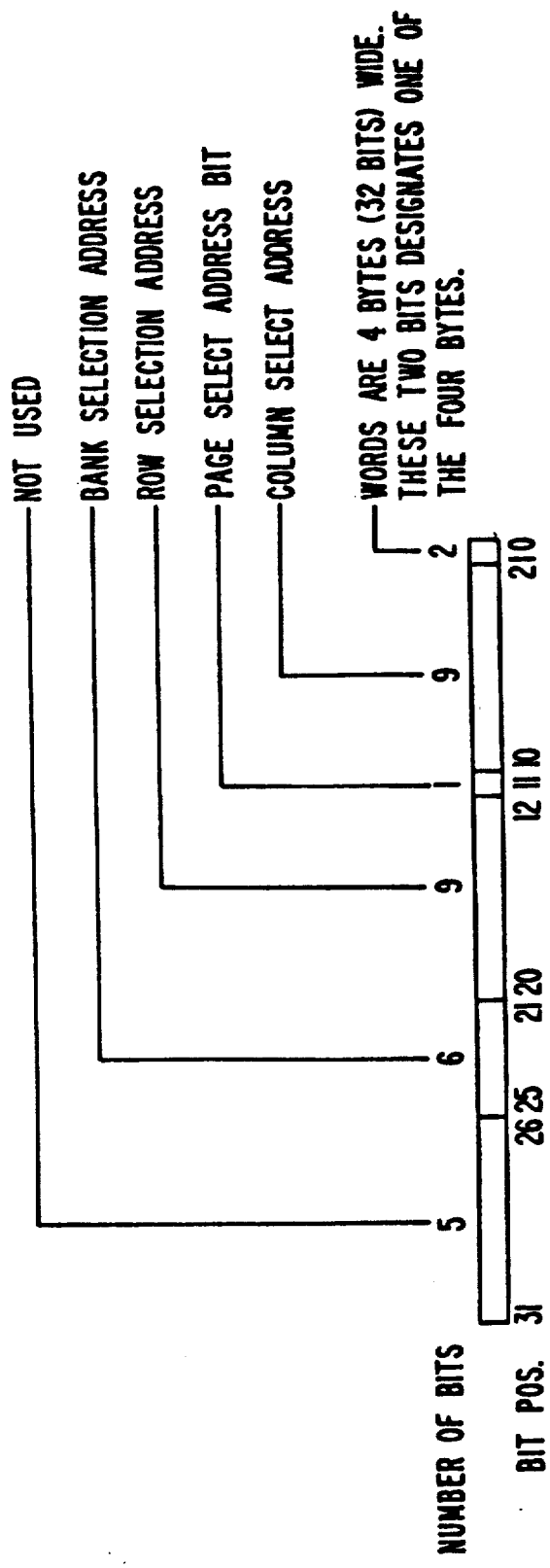
FIG._2.

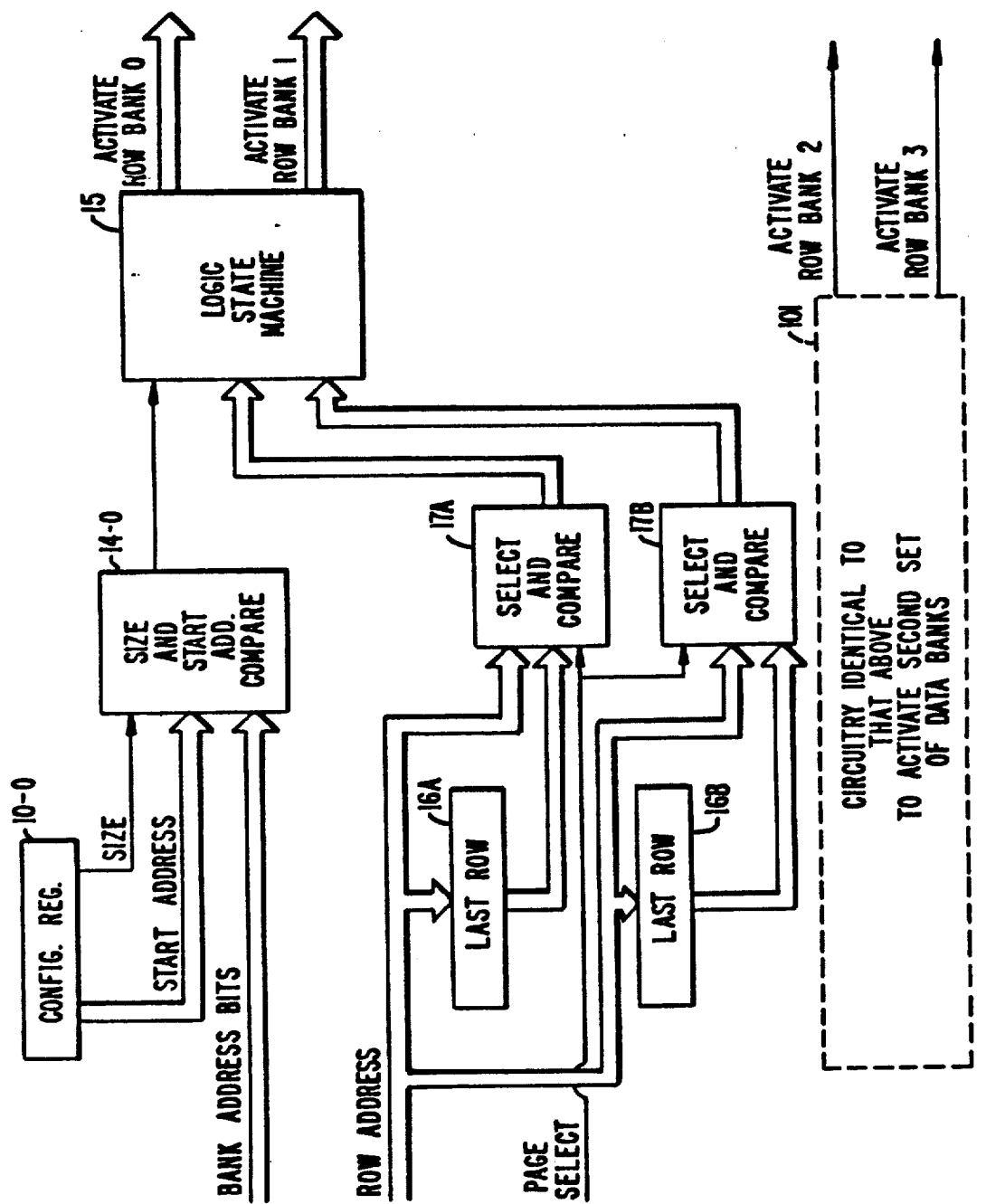
FIG._3.

ADDRESSING MULTIPLE TYPES OF MEMORY DEVICES

This is a continuation of application Ser. No. 112,967 filed 10/23/87 now U.S. Pat. No. 4,899,272.

TECHNICAL FIELD

The present invention relates to digital computers and more particularly, to memory systems for digital computers.

BACKGROUND AND PRIOR ART

Many digital computers and in particular many personal computers are designed so that the same computer can accommodate a variety of memory sizes. These computers generally have a plurality of switches which must be set to designate the amount of memory which has been inserted in the system. Other computers have an electronic means for detecting how much memory has been inserted into the computer.

With existing systems, the memory chips (called DRAMS) must be inserted in sequential sections because the system determines how much memory the system has by checking the memory up to the point where it finds no chips at a particular location.

The DRAMS generally available come in a variety of sizes and configurations. For example, at the present time 256K and 1 Meg DRAMS are very common. Such DRAMS are generally available in configurations such as, for example, 256 by 1, or 256 by 4, etc.

In many existing digital computers, only certain size DRAMS can be inserted in certain memory banks. Each memory bank can only accommodate one size of DRAMS because either switches (or some other configuration mechanism) provides the starting address of each bank and the system assumes a particular size from that starting address. Other presently known systems include physical switches which indicate the size of the DRAMS in an associated memory bank. Such systems are relatively costly and inflexible.

Thus, present digital computers and in particular present personal computers have limitations on the flexibility of how various size DRAMS can be inserted in various memory banks.

OBJECTS OF THE INVENTION

The object of the present invention is to provide an improved memory addressing and control mechanism that supports multiple types of DRAMS.

A further object of the present invention is to provide a flexible, cost effective technique for supporting multiple sizes of DRAMS.

Another object of the present invention is to provide a software programmable control mechanism for supporting multiple types of DRAMS.

Other objects and features of the invention will be apparent from the detailed description of one particular preferred embodiment of the invention which is given below.

SUMMARY OF THE INVENTION

The present invention provides a memory addressing system that can accommodate multiple size DRAMS. DRAMS of various sizes can be mixed in a variety of ways and the logical arrangement of the banks need not be the same as the physical arrangement of the banks. The present invention provides a hardware register associated with each pair of banks of DRAMS. This hardware register is programmable to indicate the type of DRAMS that have been inserted in the particular memory banks and to indicate the starting address of the particular set of memory banks.

Using this technique, it is not necessary to insert the largest memory chips in the first memory bank. Memory chips of either size can be inserted in either set of memory banks and the information in the programmable register is used to control circuitry which appropriately modifies the accessing signals which are sent to the memory system.

DESCRIPTION OF THE DRAWINGS

FIG. 1 is a simplified circuit diagram of the logic that controls the memory access mechanism.

FIG. 2 shows the meaning of the bits in a 32 bit address.

FIG. 3 shows a logical circuit diagram of a circuit 2 to address a memory in accordance with the present invention.

DESCRIPTION OF DETAILED EMBODIMENT

The specific embodiment of the invention described herein is a memory accessing system for a digital computer which has a 36 bit data bus (32 bits and 4 parity bits). A byte of data is eight bits of data: hence, a 36 bit bus can accommodate 4 bytes of data and parity bits. Hereafter, only the data bits will be discussed. Personal computers having this type of memory bus system are commercially available.

A memory system 5 which has a plurality of memory banks is shown in FIG. 1. Memory 5 is designed to accommodate either 256 K DRAMS or 1 meg DRAMS. The memory 5 can have one, two or four banks of DRAMS. Each bank can have either:

(a) Thirty-six 256 K DRAMS, that is, one megabyte of memory.
   Note: 4 bytes [32 bits] times 256 K equals 1 megabyte.
(b) Thirty-six 1 meg DRAMS, that is, four megabytes of memory.
   Note: 4 bytes [32 bits] times 1 meg equals 4 megabytes.

If there is only one bank of memory, the starting address of the bank is always zero. Furthermore, if there is only one bank of memory, the system can easily detect the amount of memory installed by trying to write and read in the higher addresses, hence, the problems associated with multiple banks of memory does not arise. The following discussion of the invention will therefore address the situation where there are a plurality of banks of memory.

As explained above, the specific embodiment of the invention described can accommodate either, one, two or four banks of memory. Where there is more than one bank of memory, the banks of memory are arranged in pairs so that there is either one or two pairs of banks. Both banks in any pair must have either 256 K DRAMS or 1 Meg DRAMS. However, any pair of banks can have either 256 K DRAMS or 1 meg DRAMS. With the present invention, the physical arrangement of the memory banks need not be the same as the logical arrangement of the memory banks. The various allowable combinations of DRAMS in the memory banks are given below:

Allowable combinations of 256 K and 1 Meg DRAMs in memory 5:

|  | PAIR ONE | | PAIR TWO | | |
| --- | --- | --- | --- | --- | --- |
|  | BANK 1 | BANK 2 | BANK 3 | BANK 4 | TOTAL Memory |
| Chip size | 256K | | | | 1 Meg |
| start address | 0 | | | | |
| Chip size | 1 Meg | | | | 4 Meg |
| start address | 0 | | | | |
| Chip size | 256K | 256K | | | 2 Meg |
| start address | 0 | | | | |
| Chip size | | | 256K | 256K | 2 Meg |
| start address | | | 0 | | |
| Chip size | 256K | 256K | 256K | 256K | 4 Meg |
| start address | 0 | | 2 Meg | | |
| Chip size | 1 Meg | 1 Meg | | | 8 Meg |
| start address | 0 | | | | |
| Chip size | | | 1 Meg | 1 Meg | 8 Meg |
| start address | | | 0 | | |
| Chip size | 256K | 256K | 1 Meg | 1 Meg | 10 Meg |
| start address | 8 Meg | | 0 | | |
| Chip size | 1 Meg | 1 Meg | 256K | 256K | 10 Meg |
| start address | 0 | | 8 Meg | | |
| Chip size | 1 Meg | 1 Meg | 1 Meg | 1 Meg | 16 Meg |
| start address | 0 | | 8 Meg | | |

Each pair of memory banks has a byte (eight bits) of associated configuration data. This byte of data indicates what type of DRAMS have been inserted into the particular pair of memory banks and the staring address of that memory.

Bits 6 and 7 of the data byte associated with each pair of memory banks indicate what type of DRAMS have been inserted into that set of memory banks. These bits are set as follows: (Note, two bits give four possible combinations.)

| 0 | no memory, bank disabled |
| --- | --- |
| 1 | 256K DRAMS (2 bank of 1 megabytes for a total of 2 megabytes) |
| 2 | 1 Meg DRAMS (2 bank of 4 megabytes for a total of 8 megabytes) |
| 3 | not used |

Bits 0 to 5 of the data byte associated with each pair of memory banks indicate the starting address of that set of DRAMS as follows:

| Starting Address | Use Address bits |
| --- | --- |
| 0 | 20 to 25 |
| 2 Megs | 21 to 25 |
| 8 Megs | 23 to 25 |

A simplified version of the circuitry which operates in accordance with this invention is shown in FIG. 1. A more complete explanation will be given later with respect to the circuitry shown in FIGS. 2 and 3. However, in order to facilitate an explanation of the invention, it will first be described with reference to the simplified flow diagram in FIG. 1.

As shown in FIG. 1, the embodiment of the invention shown herein includes a non-volatile section of memory 12B wherein system configuration data can be stored. Such memory is generally CMOS technology which can continue to store information even after the computer's main power supply has been turned off. CMOS memory uses little power and it can be operated by a relatively small battery. Computers such as the commercially available IBM AT © computer include such a section of memory.

Memory 12B is initially loaded by a configuration program 12A that asks the operator to enter data indicating what memory chips have been inserted into the particular computer. The configuration program 12A stores this data in the non-volatile section of memory. Thereafter each time the system is powered up, an initialization program 12C reads the data from the non-volatile memory 12B and stores it in the configuration registers 10-0 and 10-1.

As shown in FIG. 1 configuration register 10-0 is associated with the first pair of memory banks and configuration register 10-1 is associated with the second pair of memory banks. The data in register 10-0 and the input address are provided to a logic circuit 11-0, while the data in register 10-1 and the input address are provided to a logic circuit 11-1.

Control logic 11-0 and 11-1 includes logic circuitry that combines each address with the data that is stored in the associated configuration register to generate control signals for the memory. In this way, the computer never needs to know which physical location in memory is actually being addressed because the actual physical location is changed by logic.

Configuration program 12A is only run when the system is setup or initialized. Program 12A asks the operator to enter data which tells the system what size DRAMS have been inserted into the system. This data is stored in CMOS memory 12B. Thereafter each time the system is powered up, the data from CMOS memory 12B is transferred to registers 10-0 and 10-1. The general operation of the configuration program 12A and the way it obtains data and stores it in the CMOS memory 12B is conventional and it will not be explained further.

The configuration registers 10-0 and 10-1 each have two sections. The first section of registers 10-0 and 10-1 store bits 6 and 7 of the configuration byte associated with each bank of memory. As indicated above, these bits indicates what size DRAMS that were installed in that memory bank.

The second section of each of the registers 10-0 and 10-1 store the starting address which will be used by that section of memory. Logic circuitry 11-0 and 11-1 combines the input address with data from the associated configuration registers 10-0 or 10-1 to generate the row selection signals for the appropriate memory bank.

The column selection signal can be generated in a conventional manner.

The detailed manner that logic 11-0 and 11-1 operates will now be explained with reference to FIGS. 2 and 3. Each memory address comprises four bytes of data or 32 bits of data as shown in FIG. 2. The bits in each address word are assigned as follows:

| Bits | Function |
| --- | --- |
| 0 and 1 | Designate one of the four bytes in 32 bit word |
| 2 to 10 | column select address |
| 11 | page select bit |
| 12 to 20 | row select address |
| 21 to 25 | bank select address |
| 26 to 31 | not used |

The circuitry shown in FIG. 3 operates on a page interleaved mode. This means that if, for example, a series of memory requests includes (a) a number of requests for instructions that are located in one section of memory and (b) a request for several pieces of data that are located in a second section of memory, where the two memory sections are more than 2K apart, the data and the instructions can be accessed without waiting for a precharge cycle. This is explained in more detail in copending application Ser. No. 112,863 entitled "Interleaved Page Memory Access" which was filed on Oct. 23, 1987. The description such copending application is incorporated herein by reference. Page interleave operation is also explained in the publicly available literature which describes the 82C302 Page/Interleave Memory Controller Chip which is available from Chips and Technologies Incorporated, Milpitas, Calif. Such publicly available literature is hereby incorporated herein by reference.

A more detailed description of the logical circuitry that activates the row selection circuitry in each memory bank is shown in FIG. 3. As previously explained the memory banks are divided into two pairs. The first pair includes memory banks 0 and 1. The second pair includes memory banks 2 and 3.

Each memory address activates the row selection in only one of the four memory banks. Configuration register 10-0 contains one byte of configuration data associated with the first pair of memory banks, that is, memory banks 0 and 1. The configuration data in register 10-0 gives the starting address of that bank and the size of the DRAMS in the particular bank.

Circuit 14-0 compares the bank address bits 20 to 25 to the starting address and the size indication from register 10 to determine if a particular address is in the associated pair of memory banks. If the address is the associated memory bank, a signal is provided to circuit 15.

The row address bits are supplied to registers 16A and 16B which store the row address bits of the last row that was selected in each page. Depending on the value of the page select bit in the address either circuit 17A or 17B is activated. Circuits 17A and 17B perform the following logical operation.

If the row selected is the same as the last row that was selected, that is, if the input address does match what is in register 16A or 16B, the action taken depends on the present state of the memory. If the row is already in an accessed state, then merely select the appropriate column. If the row is not in an accessed state, then first do a row select and next do a column select.

If the row selected is not the same as the last row that was selected, that is, if the input address does not match what is in register 16A or 16B, first do a row select and then do a column select.

Logical circuits 17A and 17B are conventionally designed logical circuits, the details of which are not relevant to the present invention, hence, they will not be described further.

If circuit 14 determines that the particular address is in the associated pair of memory banks, it will send a signal to circuit 15. Circuit 15 also receives a row address and a signal from either circuit 17A or 17B which indicates if the requested row equals the last requested row. Circuit 15 is both a logic circuit and a state machine since whether or not it activates a row selection circuit depends both on the inputs it receives and whether or not the particular circuit has previously been selected. In practice circuits 14, 15, 16 and 17 can be logically combined into one logic circuit. These are herein shown as separate boxes for ease of explanation. The details of how the logic is implemented is not relevant to the present invention.

The column selection circuitry for memory 5 is not shown since it is conventional. Likewise other details of the actual memory have not been shown since they are conventional.

FIG. 3 shows a dotted box 101 which indicates that memory banks 2 and 3 have circuitry associated therewith that is identical to the circuitry shown above.

While a particular embodiment of the invention has been shown and claimed, it should be clearly understood that the invention is not limited to the specific embodiment shown herein. Many modification may be made without departing from the spirit and scope of the invention. The description of a specific embodiment is not meant to limit the scope of the invention. It is contemplated and specifically stated that the applicant's invention covers all such modifications and alternatives to the specific embodiment shown which may fall within the words and spirit of the appended claims. It is to be fully understood that all of the foregoing is intended to be merely illustrative and is not to be construed or interpreted as being restrictive or otherwise limiting of the present invention.

I claim:

1. A memory accessing system for a memory that has a plurality of physical memory banks of DRAMS having a first size and a second size with a nonvolatile memory associated with the accessing system for storing data indicating the size of the DRAMS in said physical memory banks, comprising:

means for supplying address signals to said memory banks and for generating row and column accessing signals for said memory;

a hardware configuration register;

means for transferring information from the nonvolatile memory to said configuration register to indicate which of said first and second sizes of DRAMS have been inserted in the particular memory banks; and logic means, having inputs coupled to said means for supplying address signals and said configuration register, for using the information in said configuration register to modify said row and column accessing signals.

* * * * *